(12) United States Patent
Eum

(10) Patent No.: US 11,990,021 B2
(45) Date of Patent: May 21, 2024

(54) TRAVEL SUITCASE SEARCH SYSTEM AND TAG

(71) Applicant: Gi-Jeoung Eum, Goyang-si (KR)

(72) Inventor: Gi-Jeoung Eum, Goyang-si (KR)

( * ) Notice: Subject to any disclaimer, the term of this patent is extended or adjusted under 35 U.S.C. 154(b) by 418 days.

(21) Appl. No.: 17/307,267

(22) Filed: May 4, 2021

(65) Prior Publication Data

US 2021/0272441 A1 Sep. 2, 2021

Related U.S. Application Data

(63) Continuation of application No. PCT/JP2019/028013, filed on Jul. 17, 2019.

(30) Foreign Application Priority Data

Nov. 16, 2018 (JP) ................................. 2018-215912

(51) Int. Cl.
*H04W 76/14* (2018.01)
*G08B 7/06* (2006.01)
(Continued)

(52) U.S. Cl.
CPC ............. *G08B 21/24* (2013.01); *G08B 7/06* (2013.01); *G08B 25/10* (2013.01); *H04W 76/14* (2018.02)

(58) Field of Classification Search
CPC ............ H04B 7/18513; H04B 7/18584; H04B 7/18556; H04B 7/18519; H04B 7/18521;
(Continued)

(56) References Cited

U.S. PATENT DOCUMENTS 8,299,922 B2 * 10/2012 Ben-David ........ G08B 21/0294
340/539.32
9,177,186 B1 * 11/2015 Rinehart .......... G06K 19/07758
(Continued)

FOREIGN PATENT DOCUMENTS

CN 207690450 U 8/2018
EP 3627414 A1 * 3/2020 ........... G06Q 10/087
(Continued)

OTHER PUBLICATIONS

International Search Report (PCT/JP2019/028013), WIPO, dated Sep. 17, 2019.

*Primary Examiner* — Nathan S Taylor
(74) *Attorney, Agent, or Firm* — Park & Associates IP Law Office

(57) ABSTRACT

To allow a smartphone and a tag to cooperate in searching for a suitcase, this suitcase search system comprises a smartphone, an application function unit which is implemented by an application program, and a tag attached to a suitcase. The smartphone comprises a display device, an input device, and two communication devices. The application function unit comprises a connection verification device and a suitcase lifting prevention device. The tag comprises: two communication units which correspond with the two communication devices of the smartphone; a light emitting unit; a control unit; and a power supply unit. The control unit controls each of a connection establishment mode, a sleep mode, and a wake-up mode. In the wake-up mode, the light emitting unit is caused to emit light at a blink interval which corresponds to the strengths of two radio waves.
The light emitting unit is provided with a light guiding plate. The light guiding plate comprises an acrylic plate and a film adhered to the acrylic plate, and functions as an identification marker for the possessor of the tag. It is desirable for a power switch of the tag to be locked.

11 Claims, 14 Drawing Sheets

(51) Int. Cl.
*G08B 21/24* (2006.01)
*G08B 25/10* (2006.01)

(58) Field of Classification Search
CPC ............ H04B 7/185554; H04B 7/1851; H04B 7/2041; H04B 1/12; H04B 7/185; H04B 7/18539; H04B 7/1858; H04B 7/18586; H04B 7/18597; H04B 7/2123; G01S 19/06; G01S 19/13; G01S 19/39; G01S 19/53; H04W 36/32; H04W 36/36; H04W 40/023; H04W 40/14; H04W 40/20; H04W 76/14; H04M 1/00; G09F 13/18; G09F 13/00; G08B 13/1427; G08B 21/0247; G08B 21/0266; G08B 21/0275; G08B 21/24; G08B 25/10; G08B 5/38; G08B 7/06; G08B 13/2462; G08B 13/22; G08B 13/14; G08B 13/24; G08B 21/02; G06K 19/077; G06K 7/10
USPC ....... 455/427, 13.1, 450, 513; 370/219, 236, 370/316
See application file for complete search history.

(56) References Cited

U.S. PATENT DOCUMENTS

| | | | | |
|---|---|---|---|---|
| 2006/0077058 | A1* | 4/2006 | Asher | G08B 21/24 340/568.7 |
| 2008/0231447 | A1* | 9/2008 | Grossman | G08B 13/1427 340/572.1 |
| 2009/0318189 | A1* | 12/2009 | Ben-David | G06K 19/07713 455/556.1 |
| 2011/0092161 | A1* | 4/2011 | Dotan | H04B 17/27 340/572.1 |
| 2014/0002239 | A1* | 1/2014 | Rayner | G08B 13/2462 340/5.61 |
| 2014/0173439 | A1* | 6/2014 | Gutierrez | H04L 43/10 715/738 |
| 2014/0240088 | A1* | 8/2014 | Robinette | G08B 21/0219 340/5.61 |
| 2015/0221194 | A1* | 8/2015 | Sarkar | G08B 13/1427 340/870.16 |
| 2022/0132286 | A1* | 4/2022 | Wesby | H04W 12/08 |

FOREIGN PATENT DOCUMENTS

| | | |
|---|---|---|
| JP | 2001052288 A | 2/2001 |
| JP | 2006507767 A | 3/2006 |
| JP | 2008087947 A | 4/2008 |
| JP | 2010182287 A | 8/2010 |
| JP | 4573203 B2 | 11/2010 |
| JP | 5895090 B1 | 3/2016 |
| JP | 201716213 A | 1/2017 |
| JP | 2017122713 A | 7/2017 |
| JP | 6218418 B2 | 10/2017 |
| JP | 2017532691 A | 11/2017 |
| JP | 2018026133 A | 2/2018 |
| WO | 2014098430 A1 | 6/2014 |

* cited by examiner

TRAVEL SUITCASE SEARCH SYSTEM AND TAG

REFERENCE TO RELATED APPLICATIONS

This is a continuation of International Patent Application PCT/JP2019/028013 filed on Jul. 17, 2019, which designates the United States and claims priority of Japanese Patent Application No. 2018-215912 filed on Nov. 16, 2018, the entire contents of which are incorporated herein by reference.

FIELD OF THE INVENTION

The present invention relates to a suitcase search system for a traveler to search for the travel suitcase owned by the traveler by attaching a tag to the travel suitcase, and particularly to a system that allows travelers to work in collaboration with their own smartphones.

BACKGROUND OF THE INVENTION

When a traveler travels with a suitcase, the suitcase is left in accordance with the service content of the airline, bus company, and shipping company. And when the traveler get to his destination, he gets it back. In this way, during the travel, there are times when the traveler's suitcases are away from themselves and there are times when they return to their hands.

Patent Document 1 (see the list below) discloses a technique for obtaining direction information inexpensively and efficiently by a signal transmitted from a GNSS satellite. Specifically, the satellite signals from the GNSS satellites that exist on the half sky half of the sky are shielded using the body, in the process of obtaining a limited orientation using a satellite signal captured while searching for a satellite signal of a GNSS satellite existing on the other side of a GNSS receiver installed vertically on the ground according to the body, the wavelengths on both sides of the body as a shield are subject to a certain amount of time, based on the comparison of records such as signal strength by the GNSS receiver, collecting the signal strength by the GNSS receiver for a certain period of time in the same way, the orientation information is obtained by determining whether the received GNSS satellites exist in all areas of a quarter celestial area above the sky based on the comparison of the records such as the signal intensity collected for each of them.

Patent Document 2 discloses a technology for constructing an information system and an information network centering on a physical medium, and constructing an advantageous information providing service using the product properties and physical properties of the physical medium. Specifically, the information providing system attaches a unique local ID of a specific object belonging to a specific location, and stores the unique main information of the object in a database in relation to the local ID. In addition, subordinate information, which is information related to a specific object, is stored in a database by linking main information about the specific object. When reading the local ID of a specific object by the ID reading means of the information viewer terminal, at the same time, the main information of a specific object is output in a form that can be viewed/listened to the information searcher terminal, the dependent information linked to the main information and the access history information for the access from the information viewer terminal for the main information are output in a form that can be viewed/listened linked to the main information.

Patent Document 3 discloses an anti-theft device such that the engine is not easily started even if a thief obtains a key and tries to steal an industrial vehicle. Specifically, it consists of a powerless IC card or ID tag carried by a regular flight attendant, a stationary station installed outside the vehicle that communicates with the IC card or ID tag by connecting the power supply with a timer, which has a contact point in contact with the vehicle power supply and an IC card or ID tag, to a receiver installed inside the vehicle and a power supply, a first intermittent control unit connected to a stationary station installed on the negative ground wire of the starter motor, and a second intermittent control unit connected to the timer and power supply between the station and the power supply.

Patent Document 4 provides a home delivery support system that can be linked to a home delivery company without feeling security concerns, and by using such a home delivery support system, the consignee can go out for a short time and can return home without haste if there is a slight delay, at the scheduled delivery time of the package. Specifically, it is a home delivery support system that the consignee inputs short-term absence information from the consignee terminal device, the short-term absence information and personal identification information are transmitted to the contractor terminal device, searches for the presence or absence of the scheduled delivery package, and if there is the scheduled delivery package, the package information and short-term absence information will be transmitted to the delivery staff terminal device owned by the delivery staff of the scheduled delivery package and inform the delivery staff of the time when the consignee does not receive the scheduled delivery package, and if there is no scheduled delivery package, the package information will be transmitted to the consignee terminal, and the consignee is notified that there is no scheduled delivery package.

Patent Document 5 discloses a cargo tracking device, method, and system. Specifically, the cargo tracking device includes a tracking device to collect information including location information received from the network and status information of at least one lock of the cargo article. The cargo tracking device can be arranged to be integrated into the luggage article. Provide more locking devices to secure cargo items. The locking device has a locking element that is movable between a first locked state and a second unlocked state. The cargo tracking device includes a first locking member operable to control movement of the locking element. The cargo tracking device further includes a first sensor connected to the first locking member for detecting an operation of the first locking member.

Patent Document 6 discloses a device that combines rational design, adaptive hardware and software, adapts to the legal system, and develops the adaptability that users need in output games. Specifically, according to the physical and physical non-Mr. of various groups of different types of output possessed by the user, also known as the method of raw material, the strategy for selecting a patent application analyzer is adaptation, receiving clear information input such as material system technology with the majority of functions to create a technology system that constitutes the interactive function of the system, technology of the system that can do so. Organize, adapt, and interact with the technology of the system to output better, the user needs the output function, interactive SWEET SPOT for the reaction.

In Patent Document 7, even when there are many search targets and the appearance of the search targets is similar or there are many replacements of search persons and search targets, a search support system is disclosed that efficiently searches for a search target without unnecessarily increasing the number of combinations of identification information and search targets. Specifically, while continuously updating the contents of the dynamic information storage unit, a mark that can be used depending on whether or not the terminal device and the search area in which the search target is located is used is assigned to the search target, and the label device mapped to the search target and a mark is set on the terminal device that requested the search for the search target.

Patent Document 8 discloses that a compact and economical device capable of detecting dementia/wandering persons at an early stage and with high accuracy is provided, and the usage of this device in other fields is expanded. It consists of a wireless slave unit and a master unit, and includes a communication means for transmitting and receiving radio waves, a power supply means for supplying power, a signal processing means for processing communication signals, stored data and voice output signal, and a storage means for storing data such as the issued voice, communication code number and communication distance, wherein master unit is a voice notification device such as roaming detection and loss prevention, in which a setting means capable of setting change or setting designation of stored data is provided in the storage means.

Patent Document 9 discloses a system and method for managing one or more communication devices related to a user of the communication network 110. Specifically, it has the ability to receive an indicator related to wireless communication between the first device and the second device. This indicator indicates that the first device has entered or exited the vicinity (or range) of the second device. Additionally, this is being achieved using the Bluetooth protocol IEEE802.11 (b) protocol and/or IEEE802.11 (g) protocol. For example, when the first device enters the vicinity of the second device, a call to the user may be automatically transmitted to the user's phone located in the vicinity of the second device. Likewise, with one embodiment, when the first device comes out near the second device, the call may be automatically transferred to the first device.

Patent Document 10 describes a content providing method that can be executed by using a mobile device, wherein the mobile device is a first communication unit configured to set a short-range connection to an external remote controller, and a second communication unit configured to set a connection to the external display device, wherein the external remote controller is configured to control the external display device, and wherein the content providing method includes;

the stage of displaying content on the display of the mobile device;

the stage of receiving information related to the external display installation from the external remote controller by the first communication unit;

the stage of setting the connection to the external display device by the second communication unit based on the information received from the external remote controller; and the stage in which the content displayed on the display of the mobile device is provided to the external display device, and a connection is set to the external display device by the second communication unit.

PRIOR TECHNICAL DOCUMENTS

1. Japanese Patent Application Publication No. 2017-122713
2. Japanese Patent Application Publication No. 2018-026133
3. Japanese Patent Publication No. 4573203
4. Japanese Patent Publication No. 5895090
5. Japanese Patent Application Publication No. 2017-532691
6. Japanese Patent Application Publication No. 2010-182287
7. Japanese Patent Application Publication No. 2008-087947
8. Japanese Patent Application Publication No. 2001-052288
9. Japanese Patent Application Publication No. 2006-507767
10. Japanese Patent Publication No. 6218418d.

SUMMARY OF THE INVENTION

There are more and more places using smartphone. It can be used in airports or airplanes. On the other hand, when retrieving the luggage that was left on board the plane at the destination airport, it is necessary to find one's luggage among a number of luggage loaded on the rotary conveyor. The inventors of the present invention have developed a smartphone application that cooperates with a smartphone carried by travelers such as electronic devices by preparing a tag equipped with a relatively simple electronic circuit in a travel suitcase, and it is thought that appropriate travel suitcase management will be possible. An object of the present invention is to provide a system in which a smartphone and a tag can cooperate to search for a travel suitcase.

A suitcase search system, comprising:
  a smartphone carried by a traveler;
  an application function unit for initiating a search for locating a travel suitcase by when an application program of the smartphone; and
  a tag attached to the travel suitcase,
  wherein the smartphone includes
  a display device for displaying processing contents processed by the application function unit,
  an input device for carrying out that the application function unit inputs a selection for an operator or an input by an operator in response thereto,
  a first communication device for carrying out one-to-one communication with the tag,
  a second communication device for carrying out one-to-one communication with the tag over a shorter distance than the first communication device;
  an audio output device that generates an alarm sound or vibration according to the function of the application function unit;
  wherein the application function unit includes
  a first connection verification device for verifying the connection of a one-to-one wireless communication according to the first communication device with the tag,
  a second connection verification device for verifying the connection of a one-to-one wireless communication according to the second communication device with the tag, and
  a suitcase lifting prevention device for monitoring the intensity of radio wave exchanged with the tag and providing an alarm when the intensity of radio wave is weaker than a predetermined intensity, wherein the tag includes:
a first communication unit for carrying out one-to-one wireless communication with the first communication device of the smartphone,
a second communication unit for carrying out one-to-one wireless communication with the second communication device of the smartphone,
a light emitting unit for emitting light,
a light guide plate or optical fiber that induces light emitted by the light emitting unit to emit light in a predetermined pattern,
a control unit for controlling the communication unit and the light emitting unit, and
a power supply unit to supply power to each unit,
wherein the control unit controls,
a communication establishment mode that carries out a one-to-one wireless communication between the first communication device of the smartphone and the first communication unit of the tag, and a one-to-one wireless communication is performed between the second communication device of the smartphone and the second communication unit of the tag,
a sleep mode in which only the first communication unit continues to emit radio wave at intervals when both the first communication unit and the second communication unit are unable to communicate with each other, and
a wake-up mode in which the light emitting unit is illuminated at a frequency adjusted according to the intensity of the corresponding radio wave, and at the same time, when the first communication unit of the tag resumes communication with the first communication device of the smartphone, the light emitting unit shines at a frequency adjusted according to the intensity of the radio wave, when the second communication unit of the tag resumes communication with the second communication device of the smartphone, respectively.

This makes it possible to provide tags that are useful for both lifting prevention and search for picking up checked luggage.

The light guiding plate of the tag is characterized in that a film cut into a specific pattern shape is attached to the surface of the acrylic plate. This gives the emitted light a specific pattern, which makes it easier for travelers to search. The specific pattern for cutting the film is characterized in that it functions as a marker for identifying the possessor of the tag. This makes it easier for travelers to search.

The film is characterized in that a paint that conducts light is applied in a predetermined pattern. This eliminates the need to process the acrylic plate itself, and makes it possible to manufacture tourist identification marks with a simple operation.

The light guiding plate of the tag has the film attached to both sides of the front and back sides of the acrylic plate, respectively, and displays advertisements and possessor's identification marks on the front and back sides, respectively. As a result, it is possible to support the traveler to search the suitcase while also having the function of advertisement.

The switch for turning the power ON and OFF of the tag has a locking device, and a third party other than the traveler cannot easily operate the power supply of the tag. Thus, contrary to the traveler's own intention, it is possible to prevent the tag from not working.

A suitcase search system, comprising:
a smartphone carried by a traveler;
an application function unit realized when an application program of the smartphone is installed and executable on the smartphone; and
a tag attached to the travel suitcase,
wherein the smartphone includes
a display device for expressing processing contents processed by the application function unit,
an input device for realizing that the application function unit inputs a selection for an operator or an input by an operator in response thereto,
a first communication device for realizing one-to-one communication with the tag,
a second communication device for realizing one-to-one communication with the tag over a shorter distance than the first communication device;
an audio output device that generates an alarm sound or vibration according to the function of the application function unit;
wherein the application function unit includes
a first connection verification device for verifying the connection of a one-to-one wireless communication according to the first communication device with the tag,
a second connection verification device for verifying the connection of a one-to-one wireless communication according to the second communication device with the tag, and
a suitcase lifting prevention device for monitoring the intensity of radio waves exchanged with the tag and warns when it is weaker than a predetermined intensity,
wherein the tag includes
a first communication unit for realizing one-to-one wireless communication with the first communication device of the smartphone,
a second communication unit for realizing one-to-one wireless communication with the second communication device of the smartphone,
a light emitting unit for emitting light,
a light guiding flight or optical fiber that induces light emitted by the light emitting unit to emit light in a predetermined pattern,
a control unit for controlling the communication unit and the light emitting unit, and
a power supply unit to supply power to each unit,
wherein the control unit controls, respectively,
a communication setting mode for realizing one-to-one wireless communication between the communication device of the smartphone and the tag communication unit;
a sleep mode that continuously transmits radio waves at sparse time intervals when the communication unit does not communicate;
a wake-up mode in which the light emitting unit glows at a frequency adjusted according to a corresponding signal strength when the communication unit of the tag resumes communication with the communication device of the smartphone;
and it is characterized in that the determination of disconnection of communication for switching from the communication setting mode to the sleep mode is determined by the control of the tag without receiving information and instructions from the smartphone.

Therefore, it is possible to provide a variety of helpful tags, such as anti-theft and searching for picking up checked luggage.

The present invention has the above-described configuration, by installing an application program required by a traveler and operating a smartphone using the application, thereby providing tags that are helpful in various ways, such as suitcase lifting prevention and search for picking up one's luggage entrusted.

BRIEF DESCRIPTION OF THE DRAWINGS

FIG. 4 is a flow chart of connection verification (communication setting).

FIG. 5 is a flow chart of theft prevention processing, in which

FIG. 6 shows a flow chart of processing when leaving luggage, in which

FIG. 9 is a perspective view showing an embodiment of a tag, in which

DETAILED DESCRIPTION OF THE INVENTION

Figure 1:
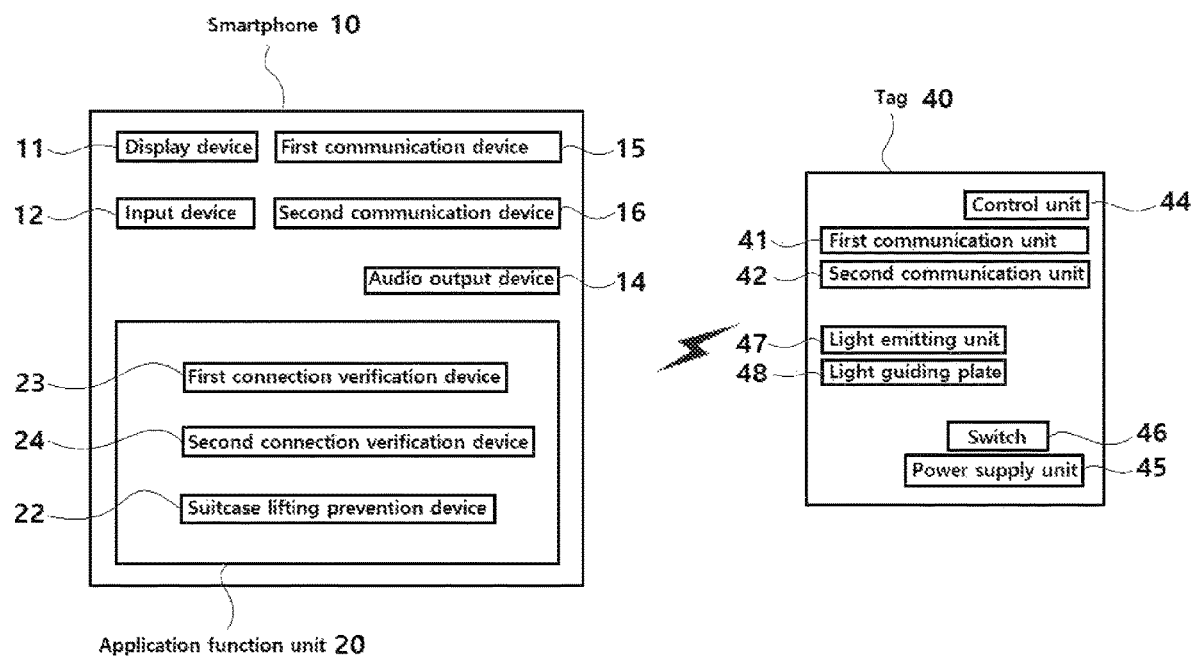
FIG. 1 is an exemplary block diagram illustrating the configuration of a suitcase search system.

Hereinafter, the best mode for realizing the system of the present invention will be described in detail with reference to the accompanying drawings. FIG. 1 is a block diagram showing the configuration of a suitcase search system. The travel suitcase search system according to the present invention consists of a smartphone 10 and a tag 40. The smartphone 10 is a terminal equipped with phone functions and tablet computer functions. A tablet computer can be used instead of the smartphone 10. In addition, a notebook with a one-to-one wireless communication function can be used instead.

The smartphone 10 is a device that operates as a computer equipped with a CPU (central processing unit), memory, etc., and has at least a display device 11, an input device 12, an audio output device 14, a first communication device 15, and a second communication device 16. The display device 11 has a liquid crystal screen, for example, and is a device that displays the processing contents of the CPU. The input device 12 is, for example, a touch panel attached to the screen of the display device 11 and functions as a pointing device. The audio output device 14 is, for example, a speaker. The first communication device 15 is a device that performs one-to-one communication with the first communication unit 41 of the tag 40. For example, it is a communication device with Wi-Fi (Wi-Fi: registered trademark) function. For reference, Android (registered trademark), one of the OSs of smartphones, has a one-to-one communication (P2P) called Wi-Fi Direct on Android 4.0 or higher, and it can be used. The second communication device 16 is a device that performs one-to-one communication (P2P) between the second communication units 42 of the tag 40. For example, it is a communication device that provides a Bluetooth (registered trademark) function. The communication method used by the second communication device 16 is a short-range communication method compared to the communication method used by the first communication device 15.

Since the smartphone 10 is a computer equipped with a CPU and memory, various application programs are installed, and when necessary, the CPU recognizes one or part of the application programs to realize the function. The application program function unit 20 shows that the CPU having loaded the application program realizes each function. Since the CPU is such a device as can be said to be a central processing unit, the CPU in a state that realizes functions by loading an application program is a device that performs each function. In that sense, the application function unit 20 has a suitcase lifting prevention device 22, a first connection verification device 23, and a second connection verification device 24.

The suitcase lifting prevention device 22 is a device that triggers an alarm when the radio wave exchanged between the tag 40 and the smartphone 10 becomes weaker than a predetermined value so that the travel suitcase with the tag 40 attached does not disappear from the possessor of the suitcase against the intention of the possessor. The first connection verification device 23 and the second connection verification device 24 are devices that establish a one-to-one wireless communication connection with the smartphone 10 and tag 40 and, when connected, verify the connection information (e.g., signal strength).

The tag 40 can exchange information in a one-to-one (P2P) wireless communication with the smartphone 10. The tag 40 includes the first communication unit 41, the second communication unit 42 that realizes one-to-one wireless communication with the smartphone 10, a light emitting unit 47 that emits light by LED, etc., a light guiding plate 48 that transmits light emitted from the light emitting unit, a power supply unit 45 that supplies power to each unit, a switch 46 that switches power supply on and off, and a control unit 44 that controls each unit.

The first communication unit 41 is, for example, a device that provides Wi-Fi (registered trademark) communication. There is a one-to-one communication mode called ad-hoc mode in the existing wireless LAN communication method. It doesn't matter if it use the ad-hoc mode to communicate. In addition, if the smartphone 10 is an Android smartphone, for example, and the Android OS version is 4.0, P2P communication, that is, one-to-one communication, is possible through a communication method called Wi-Fi Direct. At this time, it is good if the smartphone supports Wi-Fi Direct. Even if the Tag 40 communication unit 41 does not comply with the Wi-Fi Direct standard, one-to-one communication can be set using a function on the smartphone side.

The second communication unit 42 is, for example, a device that provides a Bluetooth communication function. The second communication unit uses a communication method suitable for a shorter distance than the communication unit of the first communication unit.

The light emitting unit 47 is composed of, for example, an LED. While Tag 40 is in the sleep mode, the light emitting unit 47 does not emit light. In sleep mode, the second communication unit 42 does not transmit radio waves, but only the first communication unit continues to transmit radio waves at extremely sparse time intervals. When the communication between the first communication unit 41 on the tag 40 side and the first communication device 15 of the smartphone 10 is restored, the wake-up mode is released from the power saving mode. When the wake-up mode has just been entered, the light emitting unit 47 flashes intermittently, i.e. flashes in a gentle cycle. The flashing period is long. The light emission state of the light emitting unit 47 is changed according to the communication state (signal strength) of the first communication unit 41. For example, as the radio waves become stronger, the blinking period is shortened. In addition, when communication between the first communication unit 41 and the first communication device 15 is restored, communication between the second communication unit 42 and the second communication device 16 is attempted to resume. That is, radio waves start to be transmitted from the second communication unit 42. The transmission of this radio wave is initially insufficient, and when communication is resumed, normal exchange is possible. When communication between the second communication unit 42 and the second communication device 16 is resumed, the light emission state (flashing period) of the light emitting unit 47 is changed according to the signal strength.

The light guiding plate 48 makes the light emitted by the light-emitting unit 47 shine out to be easily seen by travelers. For example, it can consist of sticking a film to the surface of an acrylic plate. This film can use EZ Free Sheet sold by EZ Corporation. EZ FREE SHEET is a unique technology in the signage field, which was born after more than 700 experiments over 3 years. Only EZ FREE SHEET enables the construction of desired signage advertisements at low cost. The important technology of EZ FREE SHEET is the manufacturing method of LIGHT GUIDEPLATE used in the existing industry. There is no need for unnecessary processes of LASER and V-CUT printing methods, and the advertisement image innovation, energy saving, and construction economics are pursued only with SHEET. The EZ FREE SHEET is formed by applying a fine dot-shaped paint in various places according to a predetermined pattern, and the light is appropriately refracted or diffracted by the paint through an acrylic plate and applied to the outside of the acrylic plate. Cut this simple EZ FREE SHEET to form the desired shape and attach it to the acrylic plate. The light emitting unit 47 (LED) is irradiated from the side of the acrylic plate.

EZ FREE SHEET has the following properties and characteristics. It is possible to fundamentally solve the blackening phenomenon of acrylic and reflective films without being bound by the size of the LGP (LIGHT GUIDING PLATE). Manufacturing of the LIGHT GUIDING PLATE is simpler than the existing acrylic light guiding flight, and it is possible to increase the size and mass production. Unlike the existing light guiding flight that processes the acrylic plate itself, a special reflective sheet pattern is used with a film that incorporates optical bonding technology.

1. V-Cutting NO! (The film is cut in a plane. Therefore, three-dimensional processing of the acrylic plate is unnecessary.)
2. High efficiency light emitting sheet
3. Unlimited applications
4. Special pattern design with optical technology
5. Illumination and brightness UP!

With this sheet, for example, a film after the traveler's name can be applied to acrylic to act as a light guiding plate, reducing the risk of the traveler being exchanged for someone else's suitcase. This sheet can be used to make a tag to attach to the suitcase. The size of the tag is not limited to the size of a tag attached to an existing travel suitcase, but can be designed freely.

The power supply unit 45 may use, for example, a coin cell battery. Coin cell batteries have conventionally been used as batteries that supply power to various electronic devices. For example, it is used to store time and BIOS setting information on the motherboard of a PC. Using a coin cell battery as a power source for the tag 40 is thought to be able to withstand several trips or half a year of use. If the coin cell battery is discharged, open the lid of the tag 40 to replace it. Or it is to be charged using a battery that can be charged. It can consider charging from a PC's USB terminal or charging a wireless power supply system.

The switch 46 is a switch capable of switching the power supply on and off from the power supply unit 45 to each unit of the tag 40. When the traveler is at home after the trip, turn off the power of the tag 40 and prevent the battery from draining the power source 45. Therefore, it is desirable to have this switch for the traveler himself/herself. On the other hand, if a third party who is trying to steal the suitcase can easily operate this switch, the third party may switch off the tag immediately before the stealing, and the suitcase may be stolen. And the possibility of returning to the traveler's own hands is lowered. Therefore, it is desirable to lock the switch so that it cannot be easily turned on and off, so that the operation of the switch is only possible in a state other than the locked state.

The control unit 44 is a controller connected to the first communication unit 41, the second communication unit 42, and the light emitting unit 47 to control them. A so-called microcomputer (microcontroller) can be used. It can also use something called a programmable digital device. It just needs a digital circuit that can execute simple programs. Although it is possible to use a processor, it is possible to construct this option at a relatively low cost by using a microcomputer and a programmable digital device.

Figure 2:
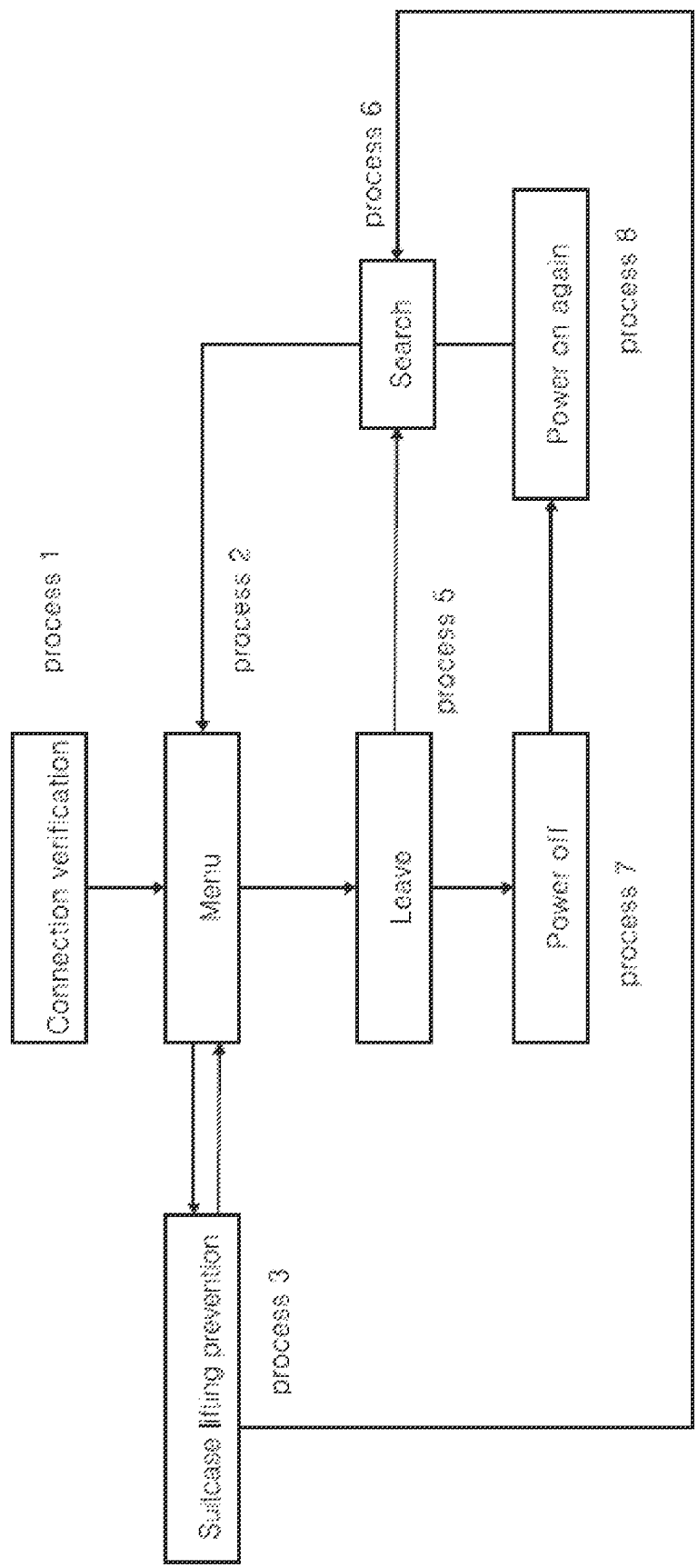
FIG. 2 is a diagram for showing process switching of a smartphone application.

FIG. 2 is a diagram for explaining process switching of a smartphone application of the smartphone 10. In the smartphone 10, the seven processes shown in FIG. 2 can be considered in relation to tag 40. Process 1 is a connection verification process, and the smartphone 10 establishes a connection by two, one-to-one wireless communication between tags 40, and acquires and stores the connection information (the other terminal number, signal strength, etc.). Process 2 is a menu processing process, and it is a menu to move to the next process after selecting one of whether the traveler who operates the smartphone 10 wants to use the suitcase lifting prevention function or wants to leave the suitcase in the future. Process 3 is a suitcase lifting prevention process, assuming that a travel suitcase is placed near the traveler, and a one-to-one wireless communication (Communication between the second communication device and the second communication unit: Bluetooth) is established between the smartphone and the tag, and the signal strength is monitored and an alarm is generated when it is weaker than a predetermined value. ASK On the other hand, when an emergency shoplifting occurs, it not only issues an alarm, but also switches to process 6 to search for a suitcase. Process 5 is the process of leaving the luggage, and the smartphone 10 stores the necessary information so that the search can be started at any time. At this time, tag 40 continues to perform sparse transmission of radio waves by the first communication unit. Transmission by the second communication unit is terminated. Process 6 is a process in which the smartphone 10 searches for a suitcase (tag 40). The traveler waits for the smartphone 10 to revive communication between the tags 40, observing the exterior of the suitcase itself and the shining light guiding plate of tag 40. Communication between the first communication device and the first communication unit is restored first, and communication between the second communication device and the second communication unit is later restored. After communication is revived, the traveler, who recognizes that tag 40 flashes, searches for a suitcase. When the suitcase returns to the possessor's hand, the traveler switches to process 3 by selecting the suitcase lifting prevention from the menu screen. At this time, the smartphone issues a command to stop light emission to stop the light emission of the tag. At this time, the traveler can turn off the switch of the tag and stop the light emission. Process 7 is the process of powering off the smartphone.

Process 8 is the process of re-powering the smartphone. Since the time from leaving the suitcase to receiving the suitcase at the destination is a relatively long time, the research was conducted to prevent battery consumption by turning off the power of the smartphone. Therefore, between process 5 and process 6, it includes powering off and re-powering. Since the smartphone has a memory, it remembers the connection information (the number of the opponent's terminal, the communication method, etc.) between tags, and it is not lost even if the power is cut off. Process 1 transitions to Process 2. Process 2 transitions to Process 3 or Process 5. Process 3 transitions to Process 2. Process 5 transitions to Process 6 or Process 7. Process 7 transitions to process 8. Process 8 transitions to Process 6. Process 6 transitions to Process 2.

Figure 3:
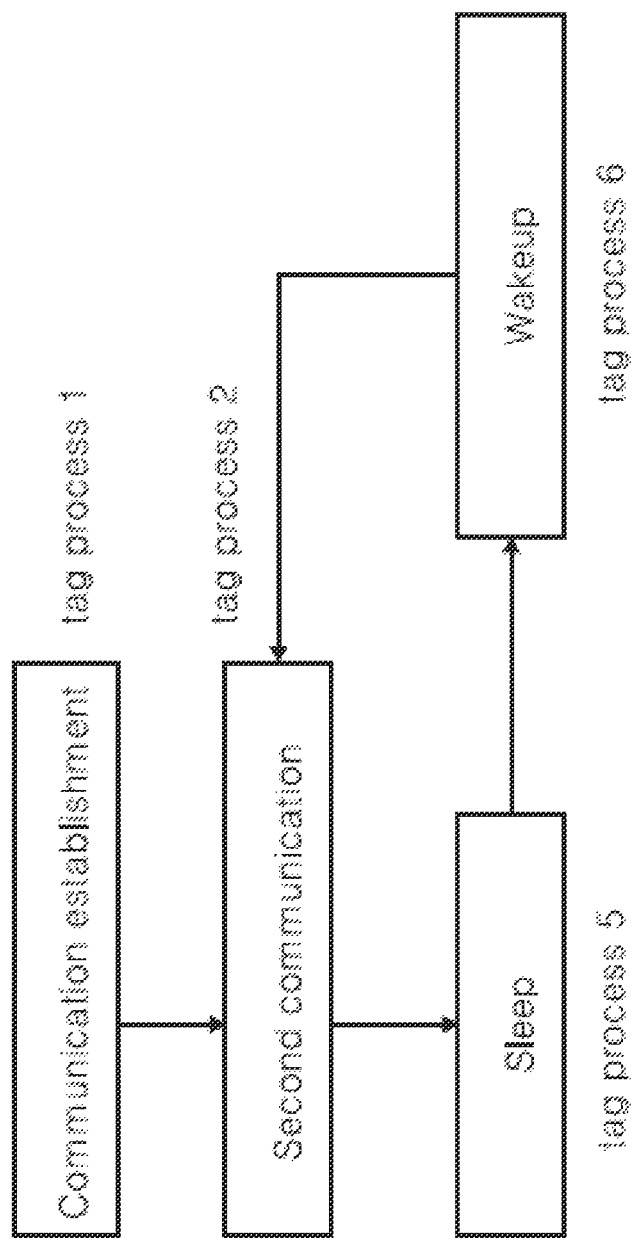
FIG. 3 is a process transition diagram of the tag controller.

FIG. 3 is a processing transition diagram of the tag 40 controller (control unit 44). Tag process 1 is the process of establishing communication. Radio waves are transmitted from the first communication unit 41 and the second communication unit 42 of the tag 40. The establishment of one-to-one wireless communication with the smartphone 10 is led and executed by the smartphone 10 side. The tag process 2 is a process of continuing only the second communication. In response to the smartphone side performing the menu processing process, the tag 40 side waits for an instruction (for example, an instruction to turn off lights) from the smartphone and follows it. Tag process 5 is a sleep process. If the communication is disconnected in the tag Process 2, it transitions to the tag Process 5. In the power saving mode, tag 40 sparsely performs the first communication. In processing other than that, it does not move and avoids power consumption. Tag process 6 is a wake-up Process. When the sparse first communication resumes, it switches to wake-up (mode). In the wake-up mode, the first communication is exchanged at regular time intervals. Tag 40 emits radio waves to revive one-to-one wireless communication by the second communication between smartphones 10. It also shines in order to make it easier to discover by travelers. Light emission is flashing. And the blinking period is based on the signal intensity. The stronger the radio wave, the shorter the blinking period. Tag Process 1 transitions to tag process 2. Tag Process 2 transitions to tag process 5. Tag Process 5 transitions to tag process 6. Tag Process 6 transitions to tag process 2. When switching from the tag Process 6 to the tag Process 2, if there is an instruction from the tag 40 smartphone (suitcase lifting prevention from the menu selection), the light emission is stopped.

Figure 4A:
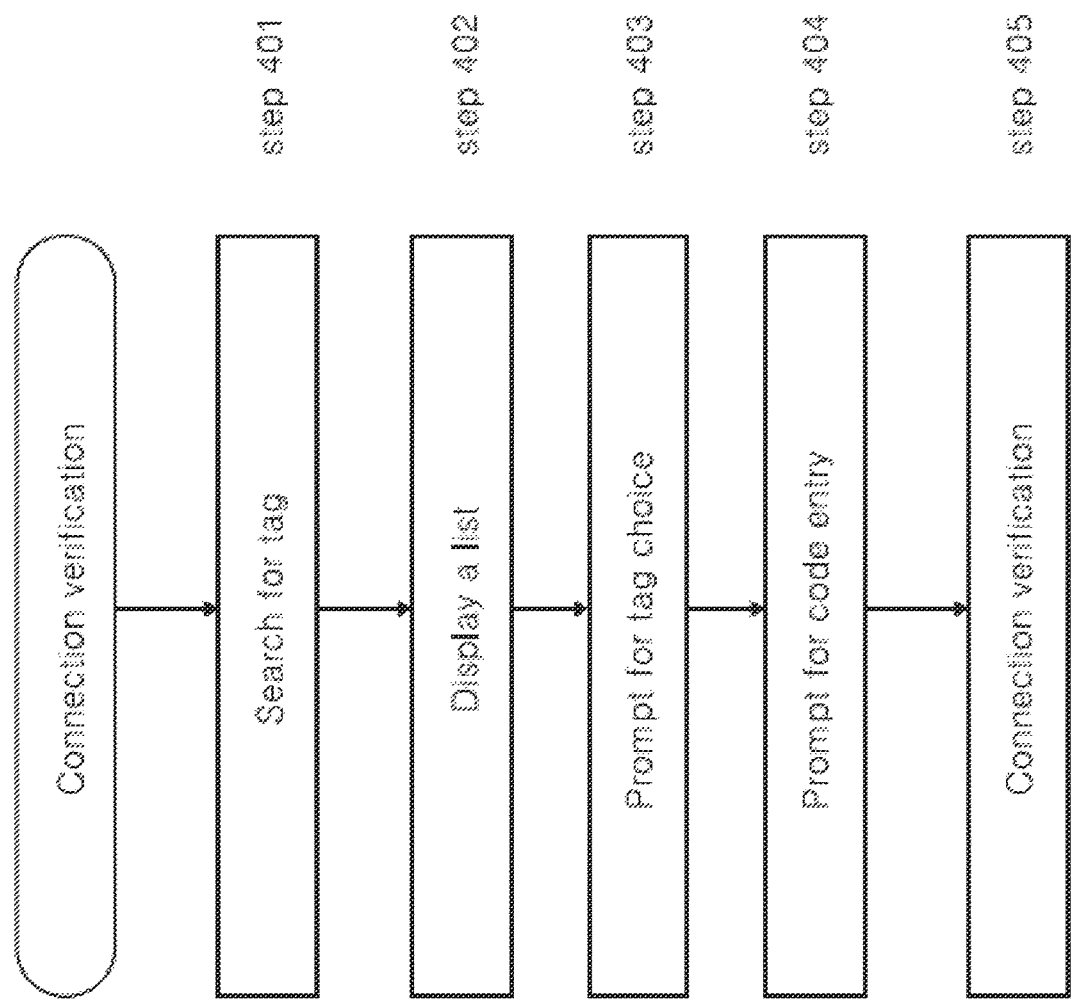
FIG. 4A shows the processing on the smartphone side.
Figure 4B:
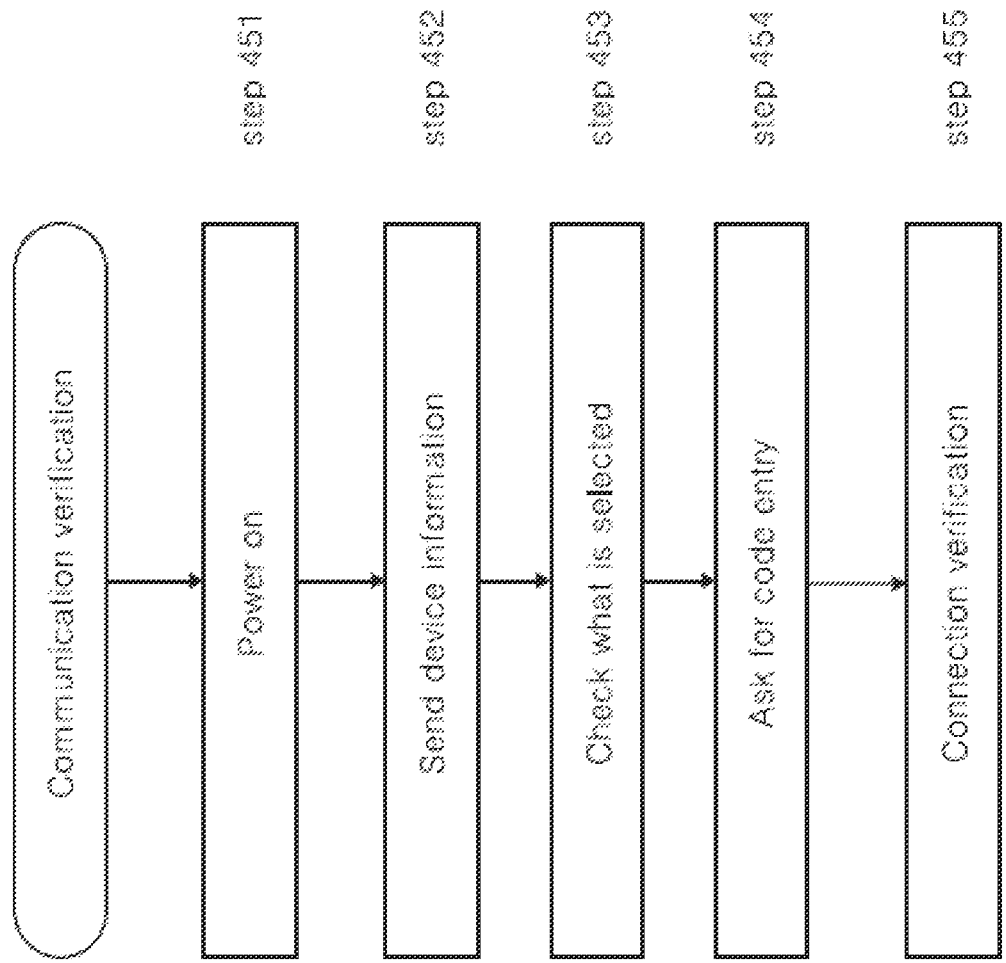
FIG. 4B shows the control process on the tag side.

FIG. 4 is a flowchart of a process for establishing a one-to-one wireless communication. FIG. 4A shows the processing on the smartphone side. The tag is searched on the smartphone side (step 401), and the tag (terminal number) found as a result of the search is listed (step 402). It is possible to find multiple tags, such as when there are other travelers nearby. Ask the traveler to choose which of the list is a traveler-owned tag. (Step 403). Since it is necessary to enter the result code chosen by the traveler, the traveler is urged to enter it. (Step 404). FIG. 4(*b*) shows control processing on the tag side. When the power is turned on to the tag 40 (Step 451), the device information (terminal information) attached to the tag 40 is sent to the smartphone (Step 452). Check whether the smartphone side has selected tag 40 according to the information sent from the smartphone (Step 453). Require code input required to set up one-to-one communication (step 454). Confirm that the correct code is entered on the smartphone side and establish a connection. (Step 455). Wireless communication is established by performing the above processing for the first communication (communication between the first communication device and the first communication unit) and the second communication (communication between the second communication device and the second communication unit), respectively.

Figure 5A:
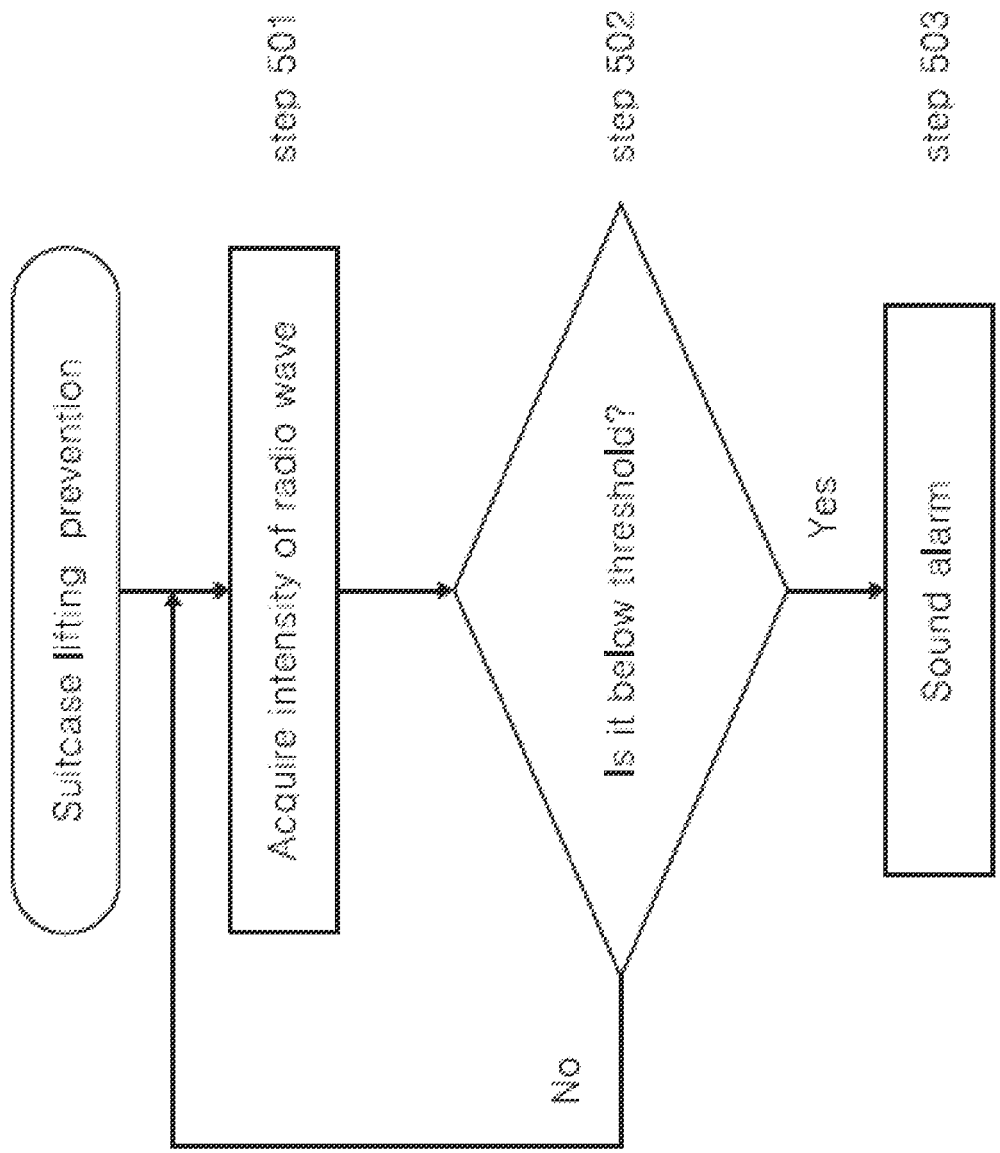
FIG. 5A shows the processing on the smartphone side.
Figure 5B:
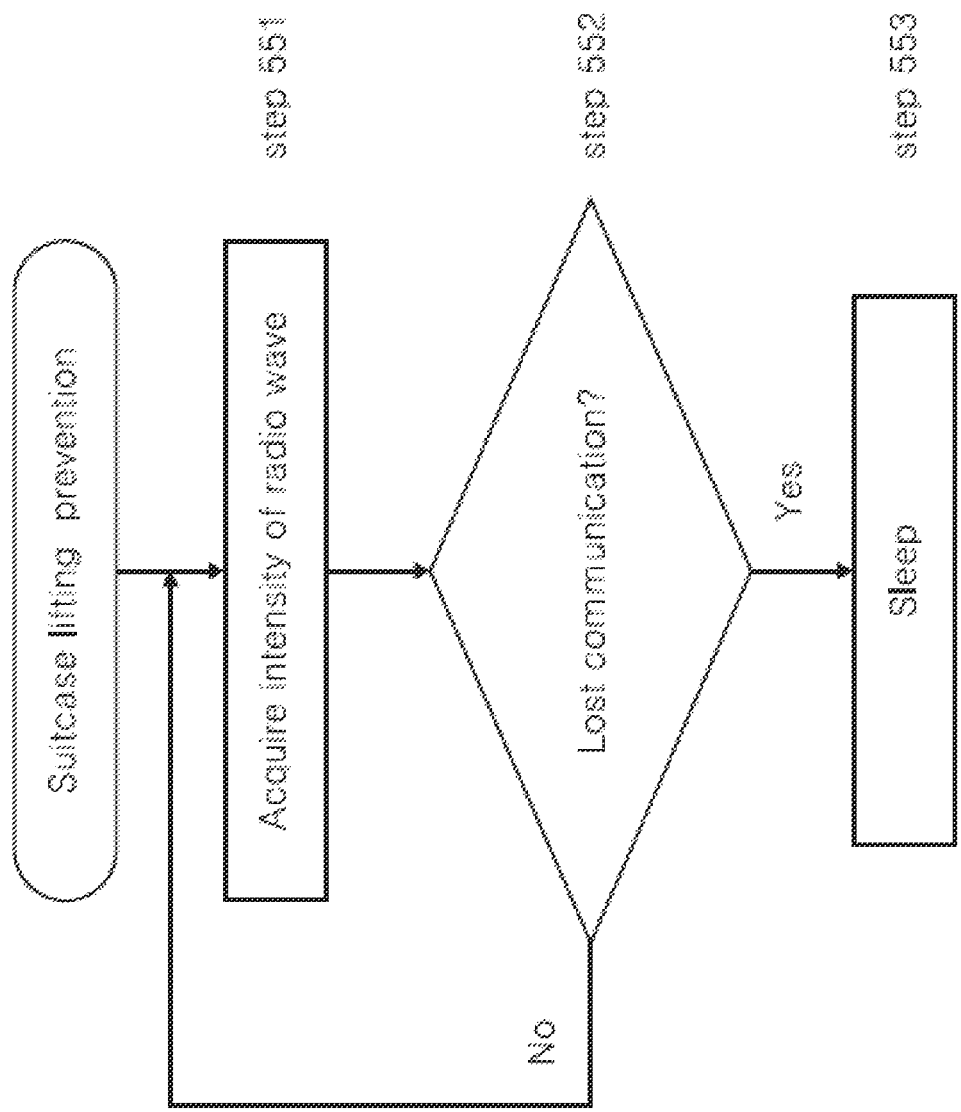
FIG. 5B shows the control process on the tag side.

FIG. 5 is a flowchart of the suitcase lifting prevention processing. FIG. 5A shows the processing on the smartphone side. The signal strength is acquired (Step 501), and it is determined whether it is lower than a predetermined value (Step 502). If it is below the predetermined value (Yes in Step 502), an alarm is issued. (Step 503). If it is not below the predetermined value, signal strength monitoring continues. (No in Step 502). Here, in determining whether or not it is below the predetermined value, instead of making the signal strength an absolute value, 50% of the original signal strength may be set as a predetermined value. It can consider triggering an alarm by making a sound from the smartphone's speaker, or displaying an alarm (e.g., a flashy design) on the smartphone's screen. FIG. 5(B) shows control processing on the tag side. The signal strength is acquired (Step 551), and it is judged whether it can be called a communication disconnection (below a predetermined value) (Step 552). If it is less than the predetermined value (Yes in Step 552), it switches to sleep mode (Step 553). If it is not below the predetermined value, signal strength monitoring is continued. (No in Step 552).

Figure 6A:
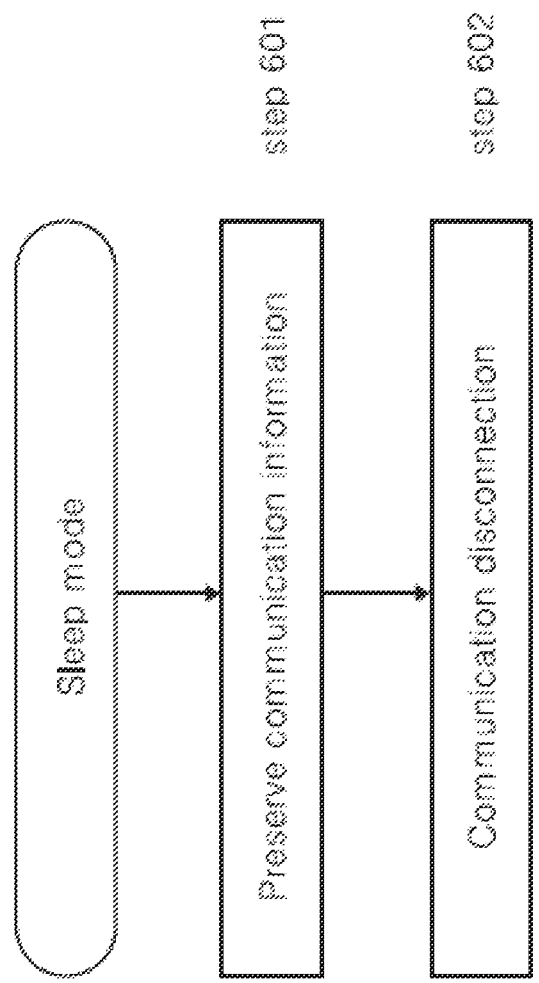
FIG. 6A shows the processing on the smartphone side.
Figure 6B:
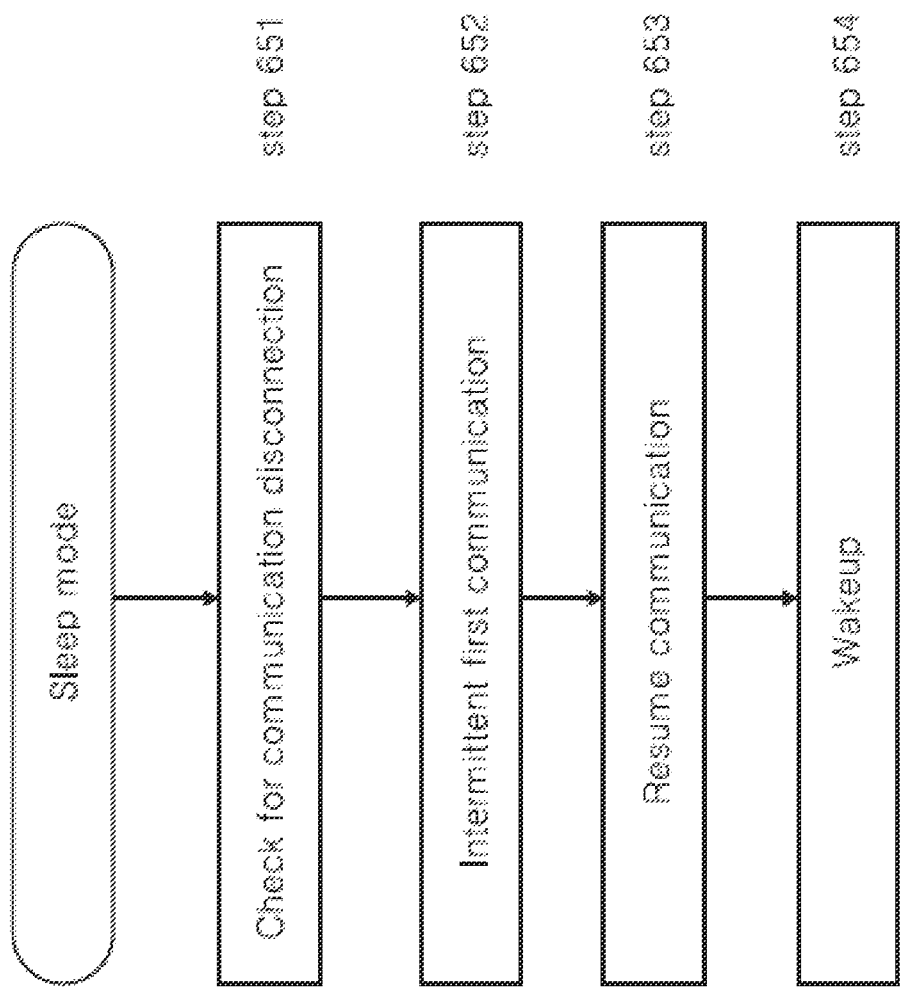
FIG. 6B shows the control process on the tag side.

FIG. 6 shows a flow chart of processing when entering the power saving mode after leaving the luggage (or in the event of being shoplifted at the suitcase lifting prevention) FIG. 6A shows the processing on the smartphone side. When leaving luggage at an airport, etc., travelers choose to leave their luggage according to the menu selection. Then, the application function unit on the smartphone side stores communication information (the model number of the communication partner, etc.) (Step 601) and disconnects the communication (Step 602). This communication disconnection disconnects both the first communication (communication between the first communication device and the first communication unit) and the second communication (communication between the second communication device and the second communication unit). FIG. 6(B) shows control processing on the tag side. After confirming the communication disconnection (Step 651), the controller at the tag side transmits only the first communication wave sparingly (Step 652), and when communication resumes (Step 653), it proceeds to the wake-up mode (Step 654).

Figure 7:
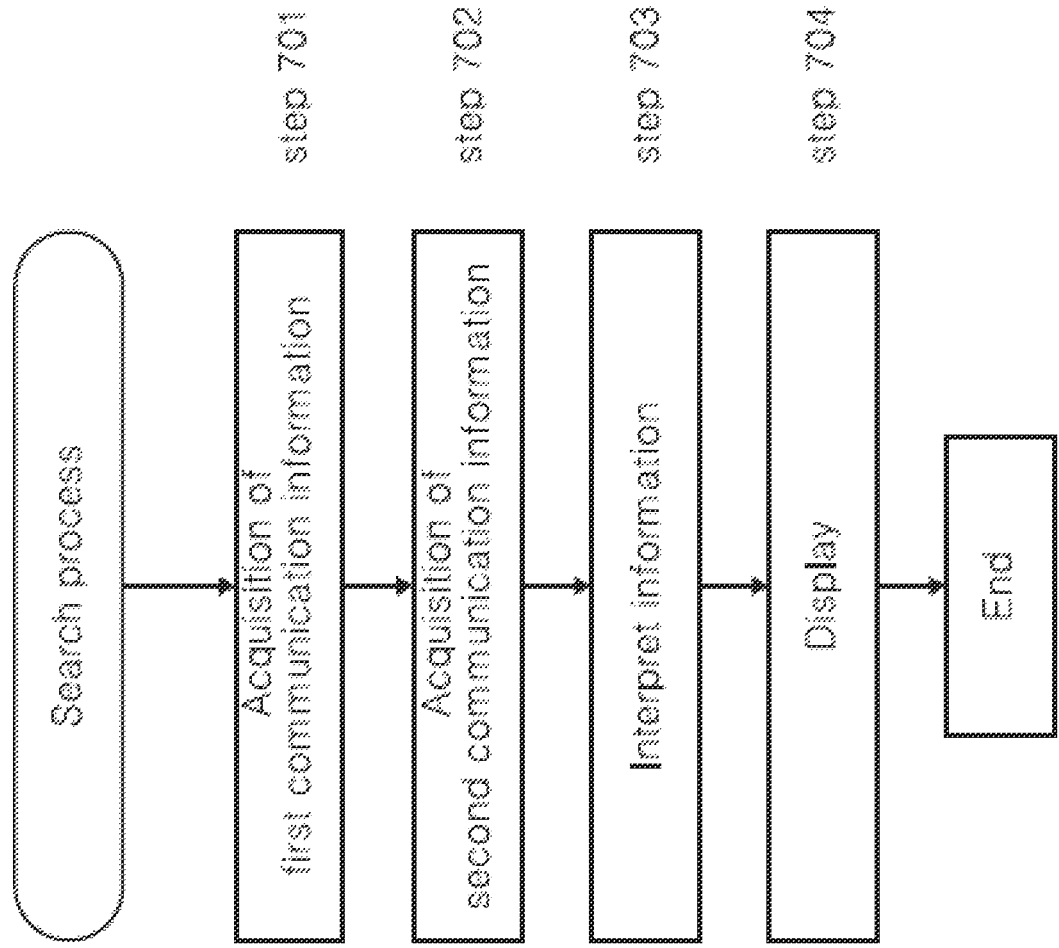
FIG. 7 is a flowchart of a search process on the smartphone side.

FIG. 7 shows the search process on the smartphone side. Travelers wait for their suitcases to come out near a rotary conveyor or the like. At that time, the smartphone application function unit acquires the first communication information (Step 701), and acquires the second communication information (Step 702). Then, the signal intensity is converted into an estimated distance (Step 703) and displayed on the screen (Step 704). Travelers use the information displayed on the screen to find their suitcase.

Figure 8:
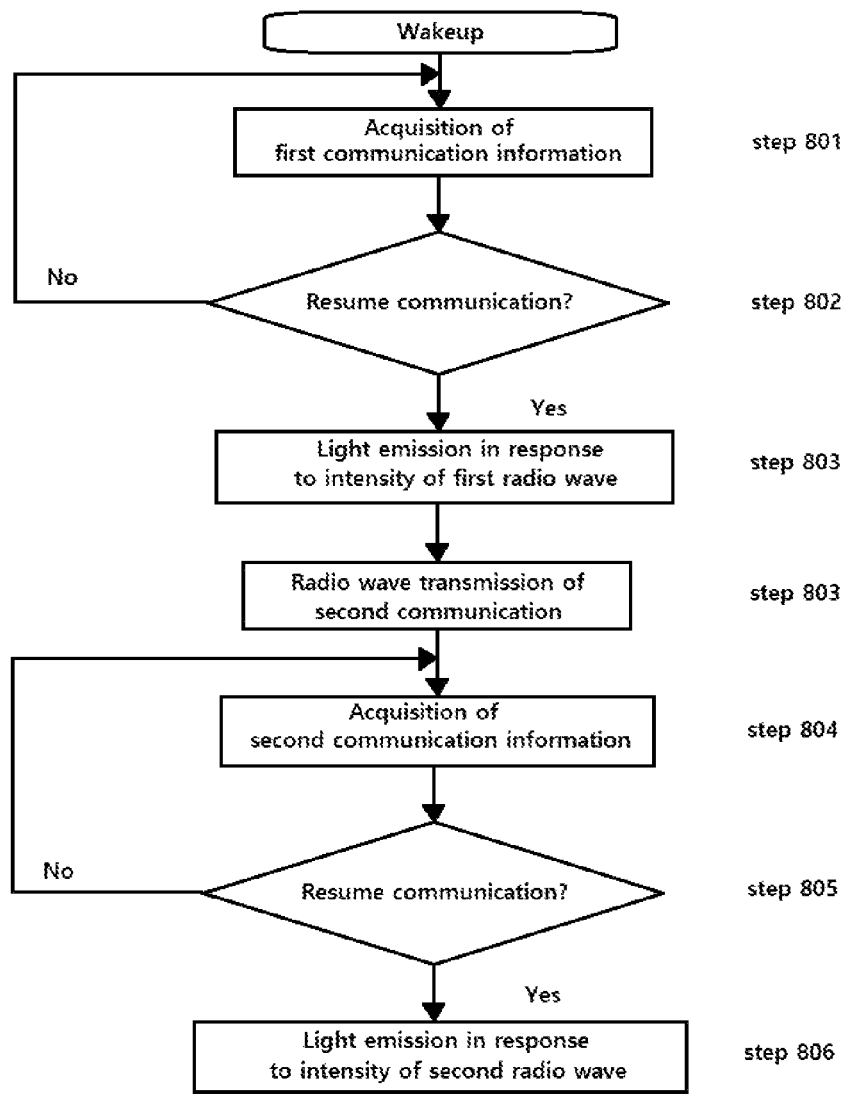
FIG. 8 shows the wake-up mode control processing of the tag.

FIG. 8 shows the control processing in the wake-up mode on the tag side. The first communication information is acquired (Step 801), and it is determined whether communication is resumed (Step 802). When communication is resumed (YES in Step 802), light emission starts according to the intensity of the first radio wave (Step 803). The stronger the radio wave, the more frequent the flashing. In doing so, the radio waves of the second communication are transmitted (Step 803). Then, when the second communication information is acquired (Step 804) and communication is resumed (YES in Step 805), light is emitted according to the intensity of the second radio wave. (Step 806). In this case, the light may be output intermittently depending on the signal intensity. That is, when the light is flickering, the length of the period, the ratio of lighting and turning off, and the time can be changed, and the intensity of the light can be changed.

«about the Light Guiding Plate»

Figure 9A:
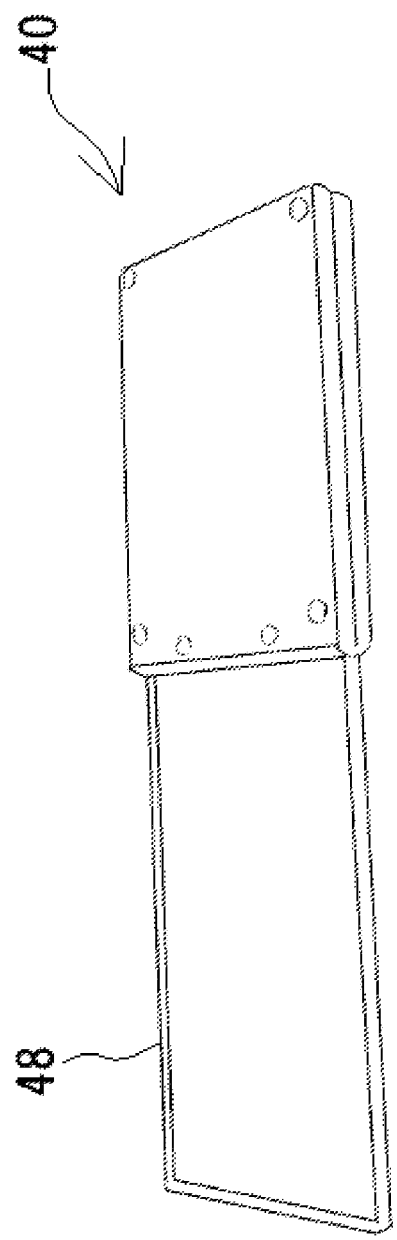
FIG. 9A shows a shape of the tag.
Figure 9B:
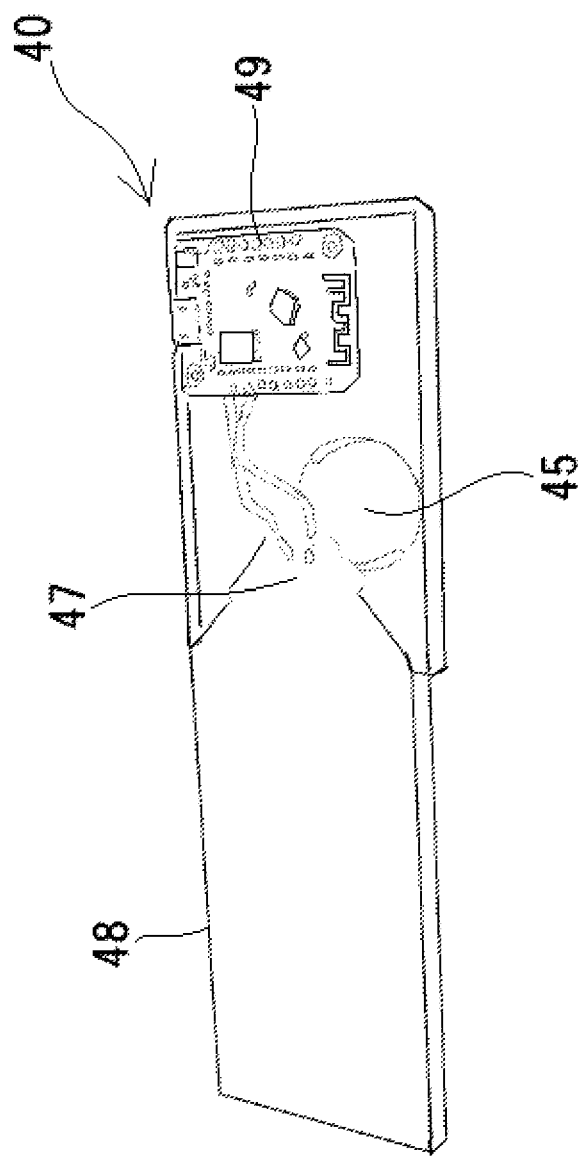
FIG. 9B shows an inside of the tag.

FIG. 9 is a perspective view showing an embodiment of a tag. FIG. 9A shows a shape of the tag. As shown in FIG. 9(A), the tag 40 includes a case including an electronic circuit and a light guiding plate 48 extending from the case. As described above, the light guiding plate 48 consists of an acrylic plate and sheet pasted on its surface. As described above, the pasted sheet is preferably a sheet sold by EZU. FIG. 9(B) shows the inside of the tag. The lid of the case in FIG. 9(A) was made to show the inside of the case. A light emitting unit (LED) 47 is installed so as to contact the acrylic plate constituting the light guiding plate 48. The light emitting unit 47 is connected to other circuits by an extension connection line on a circuit board 49. The circuit board 49 is equipped with a communication unit 41, a clock unit 42, a control unit 44, and a switch 46. If necessary, a speaker 43 can also be mounted.

«An example of displaying the approximate value of distance in signal strength»

The connection status including the signal strength of the first communication device 15 and the second communication device 16 mounted on the smartphone 10 is acquired by the first connection verification device 23 and the second connection verification device 24 of the application function unit 20. Thus, it is possible to display the signal strength on the display device 11. And since the intensity of each of the two radio waves corresponds to the approximate distance from the smartphone 10 to the tag 40, it is possible to indicate the approximate distance in numbers. When it is displayed on the display device 11, a traveler carrying a smartphone can navigate his or her own suitcase by checking the approximate distance displayed on that display device 11. In other words, the traveler can easily identify the location of the suitcase by standing at a certain point A and then moving a little immediately after obtaining the approximate distance and obtaining the corresponding approximate distance from point B again.

«About Tag Locking»

Switch 46 to turn on and off the power of the tag is installed to prevent battery consumption. Therefore, if a traveler needs it, it is desirable to be able to operate the switch 46. On the other hand, if a malicious third party trying to steal a suitcase can easily switch it off, the search system will not work. So it is desirable to be able to lock the on-off switch. For example, when locking and unlocking using a 4-digit number, it is desirable to turn the 4-digit number or enter it to unlock.

«How to Tie to the Suitcase»

The tag can be attached to the travel suitcase by a string or the like.

«About Shiny Fiber»

The shiny fiber developed by Philips of the Netherlands is known. The fiber contains LEDs. Instead of the light guiding plate of the present invention, a shining fiber may be used to generate the light of the tag. The shiny fiber can be used by the possessor of the suitcase to give a highly original decoration.

«About the Variation of the Light Guiding Plate»

As for the light guiding plate, in the present invention, a film was attached to the acrylic plate. In addition, a conventional light guiding plate may be used to provide a desired shape on the surface of the acrylic plate with a laser or the like. It is also possible to use a silk screen printing type light guiding flight.

«Possibility of Marking Suitcase Lifting Prevention as "Bus"»

In the present invention, it is assumed that the suitcase is near the traveler and a warning about the travel of the suitcase is expressed as "suitcase lifting prevention". This can also be expressed as a 'bus'. On a limousine bus (large bus) heading to the airport, passengers leave their luggage in the trunk (floor trunk) provided under the bus floor. Limousine buses pick up tourists at some stops on the way to the airport. In addition, if the airport is large, there are Terminal 1, Terminal 2, Terminal 3, and many places where travelers drop off. Since passengers on the bus are sitting in the upper seats, they may become anxious that someone else may take their suitcases from the bottom trunk by mistake. Therefore, by using the invention according to the present invention, it is put in the "suitcase lifting prevention" mode, and when one's travel suitcase falls away from himself/herself due to an unintended movement, trigger an alarm and let it know by sound or vibration. In that sense, the "suitcase lifting prevention" function is understood as "bus (mode)", and it can be understood by the passengers to display it on the smartphone screen. In this case, a menu such as "Bus Mode" and "Airplane Mode" or "BUS" or "AIRPLANE" is displayed to enable switching.

«About the Radio Wave Used»

In the present invention, it is proposed to provide a system for searching by using Wi-Fi and Bluetooth together. Although an embodiment using both radio waves has been shown, it is also possible to implement the invention using only either one. It can also use Wi-Fi and Bluetooth, as well as other radio waves. It is also possible to use the GPS function and the location specific function using a mobile base station together. In addition to combining two radio waves, an embodiment in which three types of radio waves are combined and used is also possible.

«Advertising Media and Identification Mark»

By attaching a film having a predetermined shape to the light guiding flight of the tag, the light guiding plate may become an advertisement medium. It can also function as an identification mark by displaying a person's name and his or her original shape or mark. Separate films may be attached to the front and back of the light guiding flight so that the front side is an advertisement and the back side is an identification mark. Therefore, it can be said that it is a tag that combines advertising by travel agencies, tour agencies, and the like, and one that can identify each traveler.

«Add Travel Function»

When traveling abroad, put a tag to a large trunk to use. When sightseeing in the country of the visited country, there are cases of group tours. When traveling in such a way, tagging a small bag or auxiliary bag instead of a large trunk can help with group travel. Group tours can take a chartered bus to several tourist attractions, and when moving from one place to the next, it is necessary to make a call to make sure tour leader have them all. At that time, when people such as tour leader, tour conductor, tour manager, T/C, etc. take a call, they can use their smartphone to search for tags that members have, so that the call can be smoothly performed. In the present invention, in addition to the search system includes the above-described airport function (a function to quickly search for luggage left at the airport) and a bus function (a lift-off prevention function that prevents the luggage left in the trunk room of a vehicle from being lost by others, such as when riding a bus), a travel function is added.

Now the tag's ID is something unique (which can identify one in the world). When the radio wave exchanged between the tag and the smartphone is Wi-Fi (registered trademark), a plurality of tags (for example, up to 40) exchangeable with the smartphone (candidate tags capable of one-to-one connection) may be displayed. If the tour manager recognizes the tags of all group members in advance and registers them on their smartphones, it can be confirmed that there is everyone by recognizing all of the tags when a call is needed. When it is necessary to check the situation to see if everyone is gathered, the manager can check the system with his smartphone. In addition to notifying the screen when everyone is gathered, the system can respond from the speaker to announce the gathering of everyone. When signing up for the first time, it is advisable to establish a one-to-one connection (pairing) to confirm that the ID is a tag owned by a member (a member of a group trip), and visually check that the tag illuminates. That procedure can be useful not only when registering for the first group, but whenever it need to make a roll call (to make sure all group members are present).

«Multi-Tag Recognition Device and Tag-Possessor Connection Device»

In order to add the above travel function to the luggage search system of the present invention, it is necessary to add at least two devices. First, when there are several tags nearby, a multi-tag recognition device capable of simultaneously recognizing the existence of such several tags is provided to a smartphone. Second, the smartphone application function unit includes a tag-possessor connection device in which multiple tags recognized by multiple tag recognition devices are connected with the owner, respectively. A plurality of tags recognition devices are already generally possible with current smartphones. This is because displaying multiple targets for which communication setting is possible before setting up 1-to-1 communication can be realized in Wi-Fi. The tag-possessor connection device that the smartphone application function must have is a device that connects each member's tag with the member participating in the group tour, and through this, the group tour conductor associates the tag with the tour participant and can recognize it.

When actually holding a group tour, the tour manager passes a tag to each participant in advance. Alternatively, members who have their own tags are provided with the corresponding ID information. Until the start of the trip, the IDs of all the members' tags are registered on the tour conductor's smartphone. When all the members gather, the number is displayed on the tour conductor's smartphone. Check it out and the group tour begins. Group tours go around some of the tourist attractions. The meeting time has been set at each location, confirming that they have gathered, and moving to the next location. In the case of the group, the tour conductor can check the smartphone and see the screen that everyone is gathered, or check the sound (machine sound, music, voice, etc.) on the speaker and move to the next tourist attraction.

«Display Device of Group Members' Nicknames»

It is preferable that the application function unit add a group member nickname display device displayed on the screen of the smartphone owner by changing the connection group member information to the smartphone owner in an easy-to-understand manner by the tag-possessor connection device. To make it easier for the tour conductor to remember each and every member of the tour, he may want to make a note of features or nicknames. By putting in a memo like a tall skinny Mexican, the tour manager can easily figure it out. Also, the nickname display changed by this tour manager can be made unknown to each member.

«Lighting Up the Tag»

When the tag realizes one-to-one communication with the smartphone, the control unit of the tag has a light emitting mode that establishes communication in light of the light emitting unit for a short time, and allows the owner of the smartphone to check who the owner of the tag is. Then, when there are members of several tours next to the tour conductor, it may be easier for the tour conductor to check which IDs among the members registered on his smartphone correspond to which members. When a tour conductor recognizes a tour member, it is generally recognized as a candidate to establish one to one communication without one to one communication, but only when there is a need to check the correspondence with the member in the field, the communication establishment response issuance mode is used to establish one-to-one communication with the tag, and the light is emitted through the control unit inside the tag.

«One Unique ID in the World»

It is preferable that the ID of the tag is a unique ID in the world. Accordingly, the smartphone owner may continue to recognize the recognized tag even when approaching another tag-possessor in a tourist destination. As these tags and applications become popular, there may be situations where several tour groups will come across a single tourist attraction. Even in that case, it is desirable that the ID assigned to the tag in advance is unique in the world so as not to cause confusion with the members of other tour groups.

«Speaker of the Tag»

It can also have a beep when a member of a tour group holding a tag leaves the group. When the tag is disconnected from the smartphone of the tour manager, the control unit controls to generate a warning sound from the speaker, so that a warning sound can be emitted when the tour manager is separated.

Figure 10:
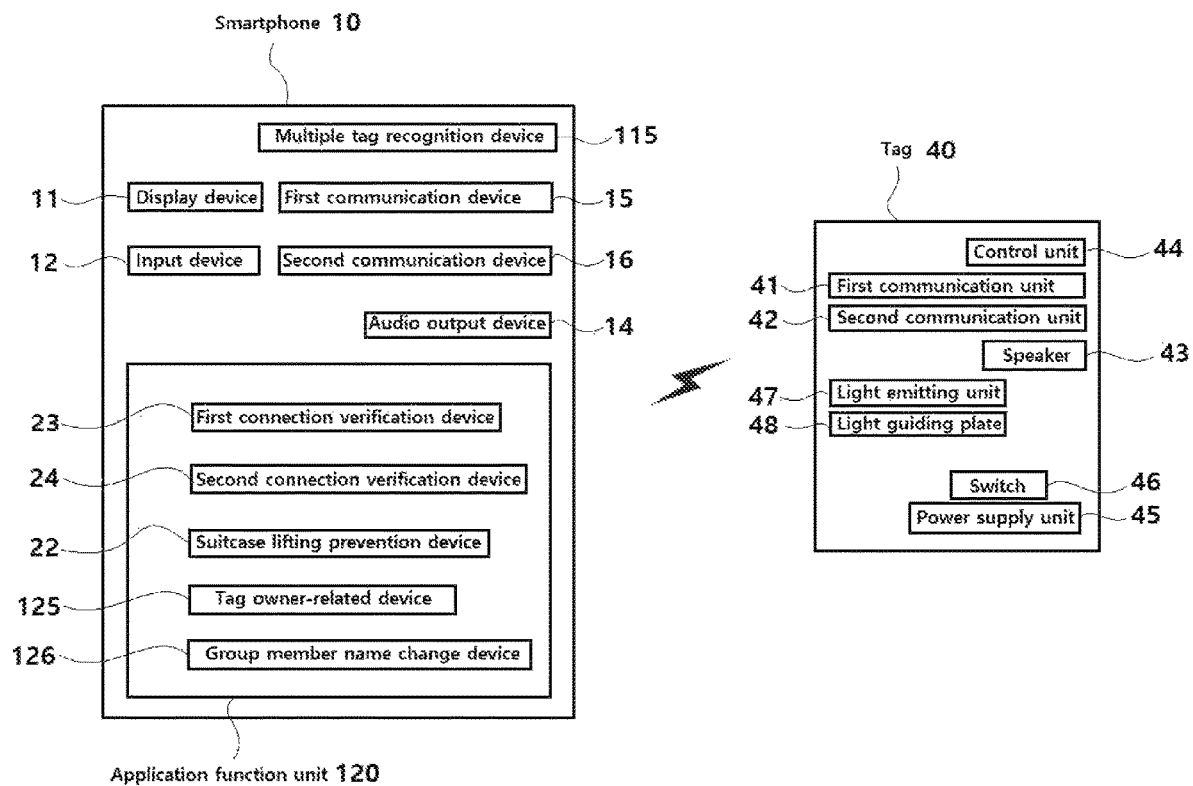
FIG. 10 is a block diagram showing the configuration of a suitcase search system to which a travel function is added.

FIG. 10 shows a block diagram of a suitcase retrieval system with a travel function added. In the smartphone 110, several tag recognition devices 115 are added, and a tag-possessor connection device 125 and a group member nickname addition device 126 are added to the application program function unit 120. As described above, the plurality of tag recognition devices 115 are already realized by a Wi-Fi device. This corresponds to the step of displaying communication target candidates before establishing one-to-one communication. Tag 40 is emitting its own ID information saying "who am I". The multiple tag recognition device 115 of the smartphone 110 recognizes various tags sending ID information and displays them. The tag-possessor connection device 125 is a device that connects tag and ID information with a tour group member. The group member nickname addition device 126 also provides possible functions such as taking notes of nicknames and their individual characteristics for ease of management by the tour conductor.

INDUSTRIAL APPLICABILITY

It can be used as a tag distributed to travelers by group tour planning companies, such as a travel agency that plans a trip by leaving luggage in various means of transportation, such as travel by plane or travel by bus.

DESCRIPTION OF REFERENCE NUMERALS 10,110 Smartphone
11 Display device
12 Input device
14 Audio out device
15 First communication device
16 Second communication device
115 Multiple tag recognition device
20,120 Application function unit
22 Suitcase lifting prevention device
23 First connection verification device
24 Second connection verification device
125 Tag-possessor connection device
40 Tag
41 First communication unit
42 Second communication unit
43 Speaker
44 Control unit
45 Power supply unit
46 Switch
47 Light emitting unit
48 Light guiding plate
49 Circuit board
51 Communication setting mode
52 Suitcase lifting prevention mode
54 Sleep mode
55 Wake-up mode
60 Communication establishment response light emitting mode

What is claimed is:

1. A travel suitcase search system, comprising:
a smartphone carried by a traveler; an application function unit for initiating a search for locating a travel suitcase by when an application program installed in the smartphone; and a tag attached to the travel suitcase;
wherein the smartphone includes,
a display device for displaying processing contents processed by the application function unit,
an input device for carrying out that the application function unit inputs a selection for an operator or an input by an operator in response thereto,
a first communication device for carrying out one-to-one communication with the tag,
a second communication device for carrying out one-to-one communication over a shorter distance than the first communication device with the tag, and
an audio output device for generating an alarm sound or vibration according to the function of the application function unit,
wherein the application function unit includes,
a first connection verification device for verifying the connection of a one-to-one wireless communication according to the first communication device with the tag,
a second connection verification device for verifying the connection of a one-to-one wireless communication according to the second communication device with the tag, and
a suitcase lifting prevention device for monitoring the intensity of radio wave exchanged with the tag and providing an alarm when the intensity of radio wave is weaker than a predetermined intensity,
wherein the tag includes,
a first communication unit for carrying out one-to-one wireless communication with the first communication device of the smartphone,
a second communication unit for carrying out one-to-one wireless communication with the second communication device of the smartphone,
a light emitting unit for emitting light,
a light guide plate or an optical fiber that induces light emitted by the light emitting unit to emit light in a predetermined pattern,
a control unit for controlling the communication unit and the light emitting unit, and
a power supply unit to supply power to each unit,
wherein the control unit controls,
a communication establishment mode that carries out one-to-one wireless communication between the first communication device of the smartphone and the first communication unit of the tag, thereby carrying out one-to-one wireless communication with the second communication unit of the smartphone and the second communication unit of the tag,
a sleep mode in which only the first communication unit continues to emit radio wave at regular intervals when the first communication unit and the second communication unit are unable to communicate with each other,
a wake-up mode in which the light emitting unit shines at a frequency adjusted according to the intensity of the corresponding radio wave, when the first communication unit of the tag resumes communication with the first communication device of the smartphone, and at the same time, the light emitting unit shines at a frequency adjusted according to the intensity of the radio wave, when the second communication unit of the tag resumes communication with the second communication device of the smartphone.

2. The travel suitcase search system according to claim 1, wherein the light guide plate of the tag has a film cut into a specific shape on the surface of an acrylic plate.

3. The travel suitcase search system according to claim 2, wherein the specific shape obtained by cutting the film serves as a mark for identifying the possessor of the tag.

4. The travel suitcase search system according to claim 2, wherein the film is coated with a light-inducing paint according to a predetermined pattern.

5. The travel suitcase search system according to claim 2, wherein the light guide plate of the tag has the film attached to both a front side and a back side of the acrylic plate, respectively, and the front side and the back side are, respectively, displayed as an advertisement and an identification mark of the possessor.

6. The travel suitcase search system according to claim 1, wherein a switch for turning on/off the power supply unit of the tag is locked, and a third party other than the traveler cannot easily operate the power supply unit of the tag.

7. The travel suitcase search system according to claim 1, wherein the smartphone further includes a plurality of tags recognition device capable of simultaneously recognizing the existence and identifications of the plurality of tags when there are the plurality of tags nearby, and the application function unit further includes a tag-possessor association device that associates the plurality of tags recognized by the plurality of tags recognition device with respective possessors.

8. The travel suitcase search system according to claim 7, wherein the application function unit further includes a group member nickname replacement device displayed on the screen of the corresponding smartphone owner by changing information of the group member associated by the tag-possessor association device to the corresponding smartphone owner in recognizable manner.

9. The travel suitcase search system according to claim 7, wherein the control unit of the tag illuminates the light emitting unit for a predetermined period of time when the tag carries out one-to-one communication with the smartphone and has a communication establishment response light emitting mode, allowing the smartphone owner to verify who owns the tag.

10. The travel suitcase search system according to claim 7, wherein the identifications of the tags are unique ones assigned to each smartphone owner, and the smartphone owners are enabled to recognize the smartphone owner's tag even if the smartphone owner is in close proximity to other tag-possessors in a tourist area.

11. The travel suitcase search system according to claim 7, wherein the tag further includes a speaker, and the control unit of the tag continuously recognizes the smartphone and the tag emits a warning sound from its speaker when it cannot recognize the smartphone.

* * * * *